(12) United States Patent
Yang

(10) Patent No.: US 7,081,686 B2
(45) Date of Patent: Jul. 25, 2006

(54) POWER SUPPLY DEVICE FOR NOTEBOOK COMPUTERS

(76) Inventor: Peter Yang, 7F, 297, Chung Hsiao East Road, Sichih City, Taipei Hsien (TW)

( * ) Notice: Subject to any disclaimer, the term of this patent is extended or adjusted under 35 U.S.C. 154(b) by 118 days.

(21) Appl. No.: 10/805,342

(22) Filed: Mar. 22, 2004

(65) Prior Publication Data

US 2005/0206165 A1 Sep. 22, 2005

(51) Int. Cl.
*H02P 9/04* (2006.01)
*F01K 15/00* (2006.01)
*F01K 25/00* (2006.01)
*F01K 25/08* (2006.01)
*H01L 35/30* (2006.01)

(52) U.S. Cl. ............................ 290/1 R; 290/2; 60/651; 60/671; 136/205

(58) Field of Classification Search ................ 290/1 A, 290/1 R, 2; 60/651, 671; 713/500; 62/3.2; 136/205, 201
See application file for complete search history.

(56) References Cited

U.S. PATENT DOCUMENTS 5,793,119 A * 8/1998 Zinke .............................. 290/2
6,143,975 A * 11/2000 Liao et al. ................... 136/201
6,307,142 B1 * 10/2001 Allen et al. .................. 136/205
6,394,175 B1 * 5/2002 Chen et al. ................. 165/80.3
6,722,139 B1 * 4/2004 Moon et al. ................... 62/3.2
6,799,282 B1 * 9/2004 Maeda et al. ............... 713/500
2002/0092557 A1 * 7/2002 Ghoshal ....................... 136/201
2002/0144811 A1 * 10/2002 Chou et al. .................. 165/236
2003/0024566 A1 * 2/2003 Watts ........................... 136/200
2003/0093995 A1 * 5/2003 Tadayon et al. ............... 60/651
2003/0117760 A1 * 6/2003 Meir ........................... 361/103
2003/0133265 A1 * 7/2003 Kinsey et al. ................ 361/687
2005/0073150 A1 * 4/2005 Patel et al. ................... 290/1 R

* cited by examiner

*Primary Examiner*—Julio C. Gonzalez R.
(74) *Attorney, Agent, or Firm*—Troxell Law Office, PLLC

(57) ABSTRACT

This invention relates to an innovative power supply device for notebook computers, more particularly to a power supply device that can be carried with a notebook computer when computer users are out and unable to access alternate current power supply. The power supply device of the invention primarily uses the heat produced by a microprocessor of the notebook computer during its internal operation and is conducted to a power generator by a heat pipe or simultaneously uses the heat produced by a fuel heat generator and converts it into the required DC power supply by an engine chamber and an electric generator. Then, the direct current power is provided to the notebook computer, so that the notebook computer users no longer need the AC power supply.

3 Claims, 3 Drawing Sheets

POWER SUPPLY DEVICE FOR NOTEBOOK COMPUTERS

FIELD OF THE INVENTION

The present invention relates to a power supply device, more particularly to a power supply device for notebook computers that uses a CPU inside a notebook computer to produce heat energy or uses a heat generator to produce heat by inflammable fuels, and the power supply device works with an electronic circuit to generate power supply for the notebook computer by the heat produced in an engine chamber and electric generator, thus allowing users to continue using the notebook computer even in an environment without access to AC power. The present invention achieves the purposes of energy recycling and reuse, and saves the cost of building a heat dispersing device in the notebook computer.

BACKGROUND OF THE INVENTION

In general, notebook computers in the market are usually restricted by the capacity of their rechargeable batteries. When a user carries a notebook computer out for its use and is unable to access alternate current power supply, the user is limited to a few hours of battery time.

SUMMARY OF THE INVENTION

In order to allow users to use their notebook computers in outdoor environments, the present invention provides a novel power supply device that uses the heat produced by a notebook computer during its internal operation or the heat produced by a heat generator that produces heat by using inflammable fuels. The heat energy is converted into the power supply by an electric generator. The present invention can achieve the effect of recycling the heat dispersed from a notebook computer and has the feature of quickly dispersing the originally generated heat.

Notebook computer users do not have access to alternate current power supply when using their notebook computers in an outdoor environment, and they can use the power supply from the battery or a battery charger that supplies the necessary electric power. In addition to supplying power to a notebook computer, the chargeable battery also takes care of the power required for the fan of the heat sink to disperse the heat produced by a microprocessor (CPU) inside the notebook computer. The power supply of the notebook computer according to the present invention can convert the heat produced by the power supply itself into electric energy. Therefore, the present invention concurrently shares the work of dispersing heat and converts heat energy into electric energy for the output, thus improving the using time of the chargeable battery and achieving highly efficient energy recycling. The present invention also saves the cost of building a heat dispersing device in the notebook computer.

The method of producing heat by using inflammable fuel according to the present invention can provide an extra supply of electric power to the notebook computer by the power supply itself. In the meantime, the electronic control circuit comprises a voltage amplifying circuit, a voltage regulating circuit, a generator rotation speed detector, an automatic electric switch, an ignition circuit, and a feedback signal, which fully achieves the automatic modulated power output and stability functions. The present invention provides a power supply device for the optimal power supply for notebook computers.

In general, a notebook computer requires alternate current power supply, and a transformer converts the AC current into the DC current for the use of a notebook computer. If a user is unable to access the AC power supply, the user can use the electric power remaining in the rechargeable battery of the notebook computer for its operation. However, when the power of the battery is exhausted, a spare battery is needed. Alternatively, the rechargeable battery takes some time for the battery to charge before the notebook computer can be used again. This is definitely a major limitation to the use of notebook computers, and also is a big issue for computer users when they bring their notebooks with them to use.

The power supply device of notebook computers according to the present invention provides a method of using a heat pipe to convert the heat energy into the electric power for the notebook computer, and lowers the cost of building a heat dispersing device in a notebook computer, or at the same time using inflammable fuel to produce heat energy and then converting the heat energy into the required electric power. The easy refilling fuel design allows computer users to carry their notebooks with them without the need of carrying any spare battery. It saves the trouble of carrying the power cord and external power supply when computer users bring their notebooks out with them. In addition to the convenience, the present invention also provides a highly efficient way of using energy, and achieves the purpose of saving energy.

DETAILED DESCRIPTION OF THE PREFERRED EMBODIMENTS

The detailed description and technical characteristics of the present invention are described together with the drawings as follows.

Figure 1:
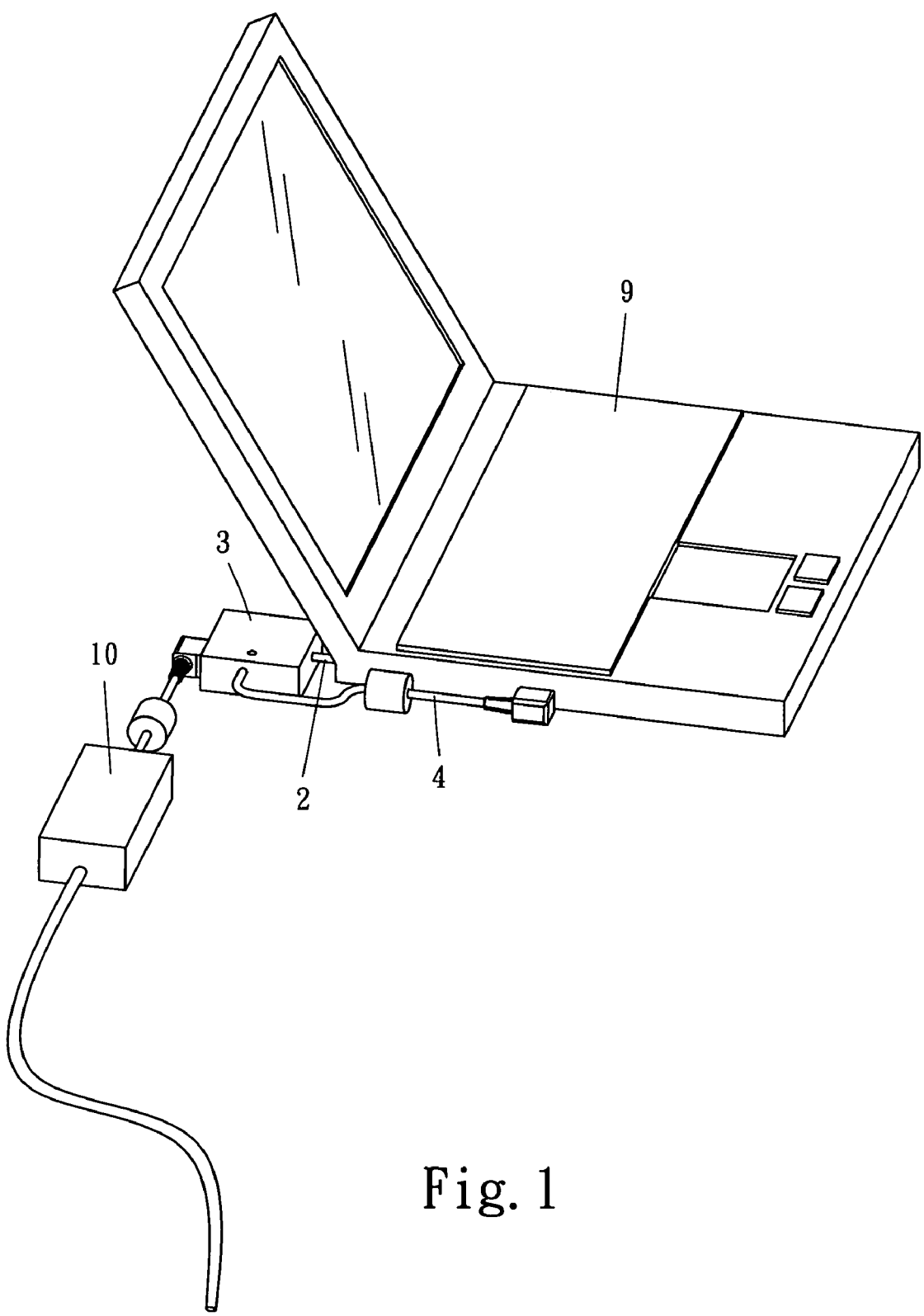
FIG. 1 is a perspective view of the power supply device for notebook computers according to a preferred embodiment of the present invention.
Figure 2:
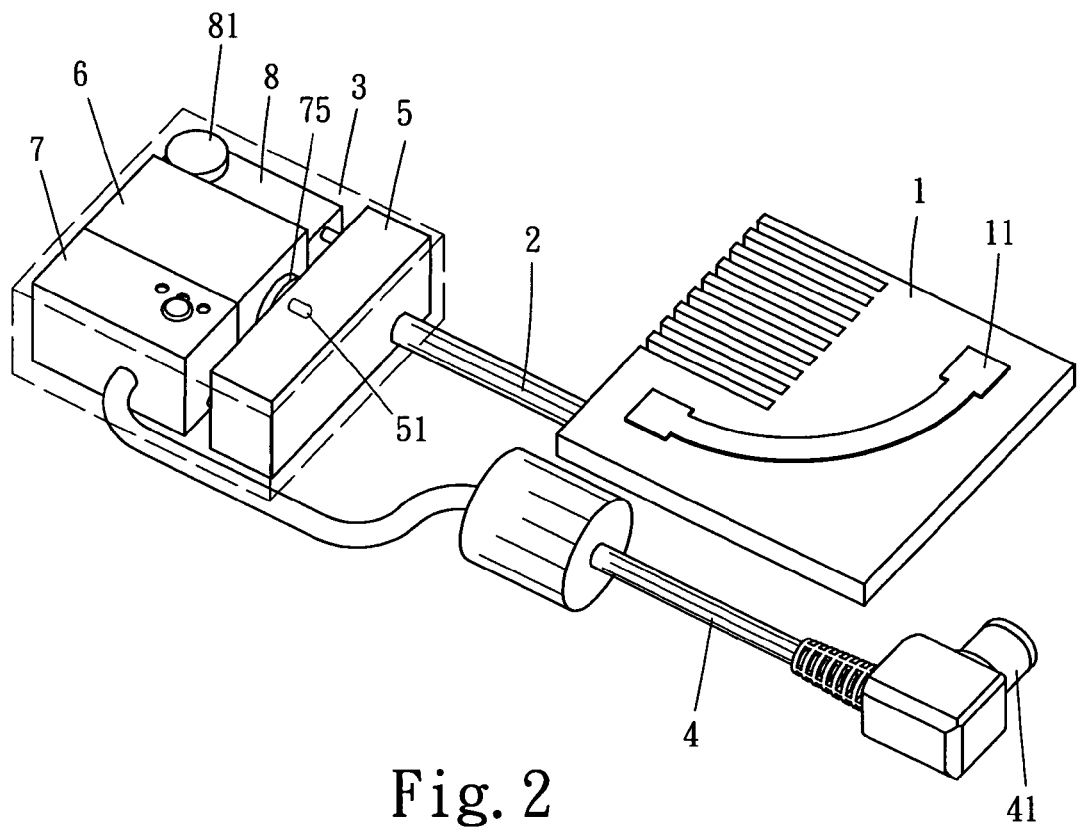
FIG. 2 is a perspective view of the major components of the power supply device for notebook computers according to a preferred embodiment of the present invention.
Figure 3:
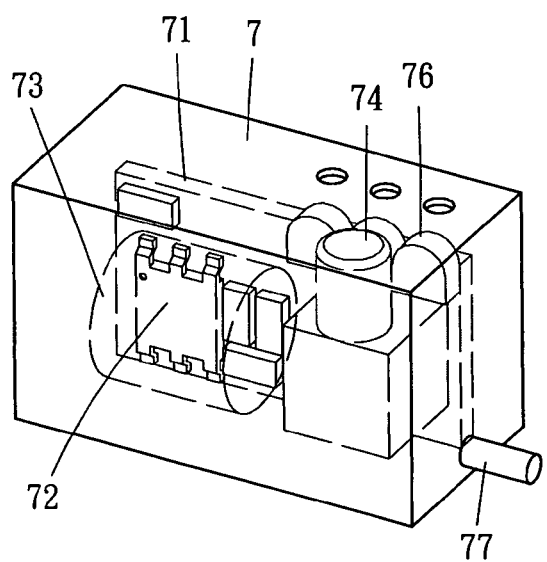
FIG. 3 is a perspective diagram of the electronic controller of the power supply device for notebook computers according to the present invention.

Please refer to FIGS. 1 and 2 for the power supply device for notebook computers according to the present invention. The power supply device for notebook computers according to the invention comprises a CPU heat sink 1, a heat pipe 2, a power supply 3, and a DC power cable 4.

In FIG. 2, the power supply 3 includes an engine chamber 5, an electric generator 6, an electronic circuit controller 7, and a fuel heat generator 8.

The engine chamber 5 is a heat-to-kinetic converter that can receive heat energy and start rotating its axle 51 by the heat energy. A heat pipe 2 is connected to one side of the engine chamber 5 for receiving the heat source conducted directly through the heat pipe 2.

The electric generator 6 is a kinetic-to-electric converter which is started by the kinetic energy to generate electric energy by an electronic circuit controller 7.

The electronic circuit controller 7 comprises an electronic controlling board 71, an electronic component 72, a start chargeable battery 73, a start switch 74, electric generator rotary speed detector 75, and control circuit indicating lamp 76 disposed inside the electronic circuit controller 7, an ignition cable 77 extended from the other end. The electronic component 72 of the electronic controlling board 71 comprises an ignition circuit A, a voltage modulate and amplify circuit B, and a rotary speed detect circuit C.

Please refer to FIG. 2 for the basic principle of the power supply device for notebook computers according to the present invention. The heat energy produced by a CPU heat sink 1 inside a notebook computer 9 is centralized by a heat pipe 11 on the heat sink and conducted to an engine chamber 5 of the power supply device for notebook computers according to the present invention through the heat pipe 2. The engine chamber 5 converts the heat energy into kinetic energy to rotate an axle 51 and start an electric generator to produce electric power. The electric power is outputted through the DC power cable 41 to supply the power to a notebook computer 9 through a connecting terminal 41.

In addition to the heat energy conducted from the CPU heat sink 1 that can start the axle rotation of the engine chamber 5 and use the electric generator 6 and the electronic circuit controller 7 to produce electric energy, the power supply device for notebook computers according to the present invention can also use the heat energy produced by supplying inflammable fuels to the engine chamber 5 which is connected to a fuel heat generator 8, and the electric generator 6 supplies electric power to the notebook computer.

The power supply device for notebook computers according to the present invention is connected between the notebook computer 9 and the battery charger 10. The heat sink 1 in the notebook computer conducts heat energy to the heat pipe 2, and the power supply generator 3 produces electric power and outputs it to the DC power cable 4, thus recycling the heat energy produced by the notebook computer 9 and saving the cost of the heat dispersing device. The present invention also can use a battery charger 10 to supply power to the notebook computer for its use both indoors and outdoors.

Please refer to FIG. 1 for a preferred embodiment of the present invention. A CPU heat sink 1 having a heat pipe 2 connected to the power supply device in a notebook computer 9 is fixed onto the notebook computer 9, such that the heat pipe 2 is extended outside the notebook computer 9. A main power supply generator 3 of the power supply device is connected to the notebook computer 9 through an engine chamber 5 and the heat pipe 2, so that the heat produced by the notebook computer is dispersed, and the heat energy is recycled. Therefore, electric power generated by the power generator 3 will be supplied to the notebook computer for its use.

In FIG. 1, the power supply device according to a preferred embodiment of the present invention is used together with a battery charger 10 originally equipped in the notebook computer. The control circuit automatically modulates the switching of the power supply. If the AC power is disconnected suddenly, then the power supply device of the present invention will immediately supply electric power to the notebook computer to maintain its normal operation. Therefore, a transient power failure will not occur due to the affection of the AC power supply environment.

In FIG. 2, the present invention comprises a fuel heat generator 8 consuming fuels to provide the function of generating heat energy similar to a pocket warmer. The heat energy is conducted to the engine chamber 5 to start the foregoing electric generator 6 to produce electric power. Therefore, if a user is in a place without AC power supply, and the battery of the notebook computer is exhausted, or the heat energy produced by the CPU of the computer is insufficient to start the engine chamber 5 and drive the electric generator 6 to produce electric power, the user can add fuel to start the device of this invention to produce and supply electric power to the notebook computer 9 for its use. In the meantime, particularly for long-hour use of the notebook computer, the design of recycling the heat produced by the notebook computer itself can extend the using time of the electric power and save energy.

The fuel used in the present invention can be designed as an easily refillable one, so that users can refill the fuel by opening a lid 81. The engine chamber 5 as shown in FIG. 2 can convert the heat energy into kinetic energy to drive an axle 51, so that the electric generator 6 can produce electric power. The rotary speed of the rotation produced by the kinetic energy is detected by an electric generator rotation detector 75 and fed back to an electronic circuit controller 7 to automatically regulate the internal rotation, and the indicating lamp 76 of the controller 7 is used to provide the information of the operation such as rotation speed, heat level, ignition condition, fuel level, or alarm.

In view of the above description, the invention can work together with a heat dispersing apparatus of a notebook computer 9, an internal CPU heat sink 1 and heat pipe 11, so that users can apply the invention by connecting the heat pipe 2. The heat pipe 2 is removable, and users can remove the heat pipe 2 and only use the fuel heat generator 8 to produce heat and generate electric power. There is no limitation on using the heat pipe 2 and the fuel heat generator 8 concurrently. The application of heat pipe 2 is based on whether or not to use the invention for recycling the heat energy produced internally by the notebook computer 9.

Figure 4:
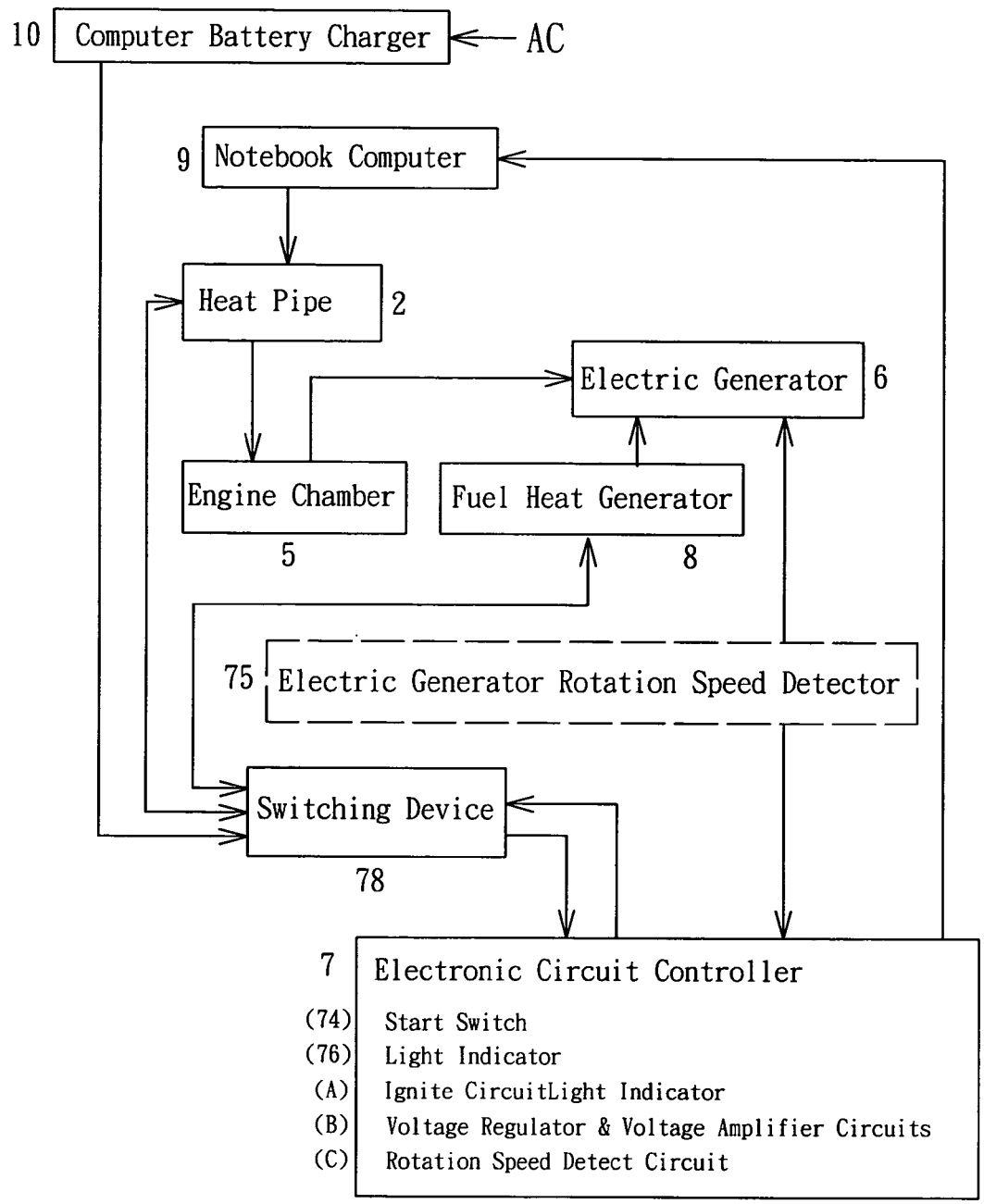
FIG. 4 is a block diagram of the control circuit of the power supply device for notebook computers according to the present invention.

Please refer to FIG. 4 for the block diagram of the present invention. If the notebook computer 9 uses general AC power to be converted into DC power, the battery charger 10 of the notebook computer 9 will send a signal to the electronic circuit controller 7 and supply the electric power to the battery charger 10 of the notebook computer 10. The electronic circuit controller 7 controls the operation of the device and stops the execution of the device of the invention.

If the AC power supply is disconnected, the CPU heat sink 1 in the notebook computer 9 has sufficient heat energy or produces enough heat energy. The heat energy will be conducted to the heat receiving engine chamber 5, and start rotating its axle 51. The electric generator 6 will convert the kinetic energy into electric energy and send a signal to the electronic circuit controller 7. Then, the switcher 78 will switch off the fuel heat generator 8, and allow the engine chamber 5 and the electric generator 6 to produce electric power for the supply.

The axle 51 rotated by the engine chamber 5 drives the electric generator 6 to produce electric power. The operation and rotation speed of the axle 51 are detected by an electric generator rotation speed detector 75 and the rotation speed detect circuit C. If the rotation is retarded to a speed that the generator cannot produce enough electric power, the switcher 78 will turn on an ON/OFF switch 74 and ignite the fire wire 78 by an ignite circuit A, such that the fuel heat generator 8 starts heating and takes over the job of the heat pipe 2 to heat up the engine chamber 5, and then the electric generator 6 will convert the kinetic energy into the electric energy for the power supply.

The power supply device of a notebook computer of the present invention uses the CPU heat sink 1 to recycle or uses the fuel heat generator to produce heat. These apparatuses can be used independently or jointly.

Regardless of providing a heat source by conducting heat from the CPU heat sink 1 through the heat pipe 2 or producing a heat source by the fuel heat generator 8 to heat up the engine chamber 5 and drive the electric generator 6 to convert the heat energy into electric power, a voltage regulating and amplifying circuit B can be adopted to regulate the voltage to a stable and appropriate DC voltage and current.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power supply device of a notebook computer, comprising:
    an engine chamber, capable of converting a heat energy selectively produced by a source selected from a group consisting of a CPU inside a notebook computer and a fuel heat generator into kinetic energy; and
    an electric generator, capable of converting said kinetic energy into an electric power, and said electric power providing DC power for said notebook computer;
    further comprising a CPU heat sink, a heat pipe, a power generator, and a DC power cable, and said power generator comprising an engine chamber, an electric generator, the electronic circuit controller, and a fuel heat generator, and said engine chamber receiving heat energy to start rotating an axle thereof and converting heat energy into kinetic energy and having one side being coupled to said heat pipe for receiving a heat source conducted from said heat pipe, and said electric generator being driven by said generator and converting said kinetic energy into electric energy in corresponsive to said electronic circuit controller;
    wherein said electronic circuit controller comprises an electronic control board, an electronic component, a start chargeable battery, a start switch, a generator rotation speed detector, and a control circuit indicating lamp; and
    further has an ignition wire extended from another end, and said electronic component comprises an ignition circuit, a voltage regulating and amplifying circuit, and rotation speed detect circuit, and said generator rotation speed detector is capable of detecting a rotation status, and said electronic circuit automatically regulates and switches the power supply, and selectively regulates and amplifies a voltage according to the output and detection of said power supply.

2. The power supply device for notebook computers of claim 1, wherein said heat energy selectively produced by said CPU and recycled by a heat pipe and produced by said fuel heat generator are installed selectively by independent and joint installations.

3. The power supply device for notebook computers of claim 1, wherein said power supply device is connectible to a battery charger provided by an original computer notebook manufacturer and automatically controlled and switched by said electronic circuit controller.

\* \* \* \* \*